(12) United States Patent
Yu et al.

(10) Patent No.: US 9,562,363 B2
(45) Date of Patent: Feb. 7, 2017

(54) SELF BONDING FLOOR TILE

(71) Applicant: Shanghai Jinka Flooring Technology Co., Ltd., Shanghai (CN)

(72) Inventors: Hsiung-Tieh Yu, Shanghai (CN); Shih-Chung Lee, Shanghai (CN)

(73) Assignee: SHANGHAI JINKA FLOORING TECHNOLOGY CO., LTD., Shanghai (CN)

( * ) Notice: Subject to any disclaimer, the term of this patent is extended or adjusted under 35 U.S.C. 154(b) by 284 days.

(21) Appl. No.: 14/262,792

(22) Filed: Apr. 27, 2014

(65) Prior Publication Data

US 2014/0227475 A1    Aug. 14, 2014

Related U.S. Application Data

(63) Continuation-in-part of application No. 12/944,718, filed on Nov. 11, 2010, now abandoned.

(30) Foreign Application Priority Data

Oct. 26, 2010   (CN) .......................... 2010 1 0522705

(51) Int. Cl.
*E04F 15/02* (2006.01)
*E04C 2/24* (2006.01)
(Continued)

(52) U.S. Cl.
CPC ......... *E04F 15/02155* (2013.01); *B32B 3/263* (2013.01); *B32B 3/30* (2013.01);
(Continued)

(58) Field of Classification Search
CPC ................ Y10T 428/23914; Y10T 428/23943; D06N 7/0097; B32B 5/00; B32B 5/12; B32B 2419/04; E04F 15/0215; E04F 15/02155
(Continued)

(56) References Cited

U.S. PATENT DOCUMENTS 2,494,848 A  *  1/1950  Whitelegg .............. B32B 27/00
                                                        156/182
2,714,559 A  *  8/1955  Sheffield .............. D06N 7/0028
                                                        156/279

(Continued)

FOREIGN PATENT DOCUMENTS

| CN | 101725239 A | 6/2010 |
| CN | 101831263 A | 9/2010 |
| CN | 201605766 U | 10/2010 |
| GB | 2359779 A | 5/2001 |

*Primary Examiner* — Cheryl Juska
(74) *Attorney, Agent, or Firm* — Cheng-Ju Chiang

(57) ABSTRACT

A self bonding floor tile includes a main body and a self bonding layer connected with the main body. The self bonding layer includes an absorptive element, a first adhesive and a second adhesive. The first adhesive connects the main body with the self bonding layer. The absorptive element includes a plurality of fibers which are implanted into the first adhesive by flocking process with at least a portion of the absorptive element extending into the first adhesive, and at least a portion of the second adhesive penetrates into the other portion of the absorptive element for connecting the self bonding layer with a support body going to be decorated. The present self bonding floor tile can be quickly installed, easily and partly replaced with low installation and replacement cost.

19 Claims, 3 Drawing Sheets

(51) Int. Cl.
  *B32B 3/26* (2006.01)
  *B32B 3/30* (2006.01)
  *B32B 5/00* (2006.01)
  *E04F 15/10* (2006.01)

(52) U.S. Cl.
  CPC ............... *B32B 5/00* (2013.01); *E04C 2/24* (2013.01); *E04F 15/0215* (2013.01); *E04F 15/105* (2013.01); *E04F 15/107* (2013.01); *B32B 2419/04* (2013.01); *Y10T 428/23914* (2015.04); *Y10T 428/23943* (2015.04); *Y10T 428/2457* (2015.01); *Y10T 428/24579* (2015.01); *Y10T 428/28* (2015.01); *Y10T 428/2848* (2015.01)

(58) Field of Classification Search
  USPC .................................................. 428/86, 90
  See application file for complete search history.

(56) References Cited

U.S. PATENT DOCUMENTS

| | | | | |
|---|---|---|---|---|
| 3,135,647 | A * | 6/1964 | Wheeley | E04F 13/0885 156/247 |
| 3,459,579 | A * | 8/1969 | Newman | D04H 11/00 427/200 |
| 3,496,054 | A * | 2/1970 | Baigas, Jr. | D04H 11/00 156/72 |
| 4,282,051 | A * | 8/1981 | Terpay | A47G 27/045 156/71 |
| RE31,252 | E * | 5/1983 | Terpay | A47G 27/045 156/71 |
| 4,404,243 | A * | 9/1983 | Terpay | A47G 27/045 156/71 |
| 4,430,372 | A * | 2/1984 | Knoke | D04H 11/00 427/200 |

* cited by examiner

SELF BONDING FLOOR TILE

CROSS-REFERENCE TO RELATED APPLICATIONS

This is a continuation-in-part application of an application Ser. No. 12/944,718, filed Nov. 11, 2010, which claims benefit of Chinese patent application No. 201010522705.1, filed on Oct. 26, 2010. The entirety of the above-mentioned patent applications are hereby incorporated by reference herein and made a part of this specification.

FIELD OF THE INVENTION

The present invention relates to a ground decoration material, more particularly to a self bonding floor tile.

BACKGROUND OF THE INVENTION

With the improvements of living standards, people paid more attentions to home environments, as an important component of interior decoration, floor tile, of course, obtains more attentions. Presently, the widely used floor tiles comprise woodiness floor tile, natural stone floor tile, and composite floor tile, or etc. All of the currently installation manners used for various floor tiles have obvious shortcomings, which are described in detail as follows.

The woodiness floor tiles are interlocked with each other into one piece, if some of the floor tiles are damaged and need to be replaced, the whole floor needs to be replaced, which causes high replacement cost. The natural stone floor tiles are adhered to the ground by cement, once the floor tiles are installed, they cannot be replaced except for destroying them. The composite floor tiles are adhered to the ground by white glue, Acryl glue or other chemical glues. They are permanently adhered to the ground and cannot be partly replaced except for destroying them. Furthermore, such present floor tiles have a common shortcoming of need to be installed by special technical workers, which increases the installation cost of the present floor tiles.

For decreasing the installation and replacement cost, technician of the industry had conducted many attempts. One kind of the products having low installation and replacement cost includes an upper portion and a lower portion, both of the portions have similar configurations and similar sizes. During manufacturing, opposite sides of the floor tiles are manufactured to structures capable of being overlapped. During installation, the products are staggered according to a predetermined special position relationship and the overlapped portions are coated with hot-melt pressure sensitive adhesive, then corresponding sides of adjacent floor tiles are adhered together under pressure, and all the floor tiles are joined together into a single piece. However, such floor tiles still have obvious shortcomings. Because the opposite sides of the floor tiles are coated with adhesive, and the floor tiles are generally long, it is uneasy to place the floor tiles at the right position during adhering; furthermore, once two floor tiles are joined together, it is hard to reregulate their positions. Thus, the worker could not make sure of an accurate and perfect installation, thereby influencing the usage of the floor. Moreover, because the working surfaces of the floor tiles are joined together as a single piece, the problem of localised replacement still cannot be well resolved.

Another kind of floor tiles has greater weight and thickness than conventional floor tile, and includes a plastic layer of low hardness at its bottom. During installation, due to the adaptability (which means the bottom of the floor tiles can be reshaped according to the ground condition) generated by the their own weight and their soft bottom layers of the floor tiles, the floor tiles can be directly installed to the ground without any glue. The floor tiles can be installed and replaced easily, but because there is no adhesion between the floor tiles and the ground, the floor tiles can easily be moved by external force during usage, which influences the usage of the floor tiles.

Therefore, it is need to provide an improved product for substituting the present conventional floor tile, which can not satisfy the usage function only, but also can be easily installed, partly or wholly replaced with low cost. Furthermore, the product of the present invention can also be used for decorating ceiling, wall and wardrobe besides decorating the ground.

SUMMARY OF THE INVENTION

Therefore, the object of the present invention is to provide a self bonding floor tile, which can be quickly installed, easily and partly replaced, and with low installation and replacement cost.

The present invention provides a self bonding floor tile, which includes a main body and a self bonding layer connected with the main body. The self bonding layer includes an absorptive element, a first adhesive and a second adhesive. The first adhesive connects the main body with the self bonding layer. The absorptive element includes a plurality of fibers and the fibers are implanted into the first adhesive by flocking process with at least a portion of the absorptive element extending into the first adhesive and the other portion of the absorptive element extending beyond the first adhesive. At least a portion of the second adhesive penetrates into the other portion of the absorptive element for connecting the self bonding layer with a support body which could be decorated by a plurality of the self bonding floor tiles.

The present invention provides a self bonding floor tile, which includes a main body and a self bonding layer. The self bonding layer is disposed under and connects with the main body for connecting the self bonding floor tile with a support body which could be decorated by a plurality of the self bonding floor tiles. The self bonding layer includes an absorptive element, a first adhesive and a second adhesive. The first adhesive is in a solid-liquid mixing state at first, and at least a portion of the absorptive element is added into the first adhesive with another portion of the absorptive element extending beyond the first adhesive. The absorptive element is secured to the main body after the first adhesive being cured. At least a portion of the second adhesive penetrates into the another portion of the absorptive element after the first adhesive being cured.

The present invention provides a self bonding floor tile, which includes a main body and a self bonding layer. The self bonding layer is disposed under and connected with the main body, for connecting the self bonding floor tile with a support body which could be decorated by a plurality of the self bonding floor tiles. The self bonding layer includes an absorptive element, a first adhesive and a second adhesive. The absorptive element includes a plurality of fibers being implanted into the first adhesive in a style like hair in scalp, with at least a portion of the absorptive element extending beyond the first adhesive. The second adhesive penetrates into the at least a portion of the absorptive element The self bonding floor tile of the present invention utilizes the fiber as the absorptive element of the self bonding layer, due to the soft and porous characteristics, the self bonding floor tile will not excessively bonded to the support body going to be decorated. Therefore, when the self bonding floor tile needs to be partly replaced, it is convenient to remove the part of the self bonding floor tile which needs to be replaced. Furthermore, due to the porous and large surface area characteristics of the absorptive element, when spreading the second adhesive, the second adhesive will penetrate into the interior of the absorptive element besides spreading over the outer surface of the absorptive element. Therefore, the adhesion between the second adhesive and the absorptive element is greater than the second adhesive and the support body going to be decorated. Thus, when removing or replacing the self bonding floor tile, the self bonding floor tile can be easily removed from the support body by a sufficient force without leaving debris of the second adhesive on the support body. This simplifies the remove process of the self bonding floor tile, and makes the self bonding floor tile can be easily and partly replaced, with low installation and replacement cost.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
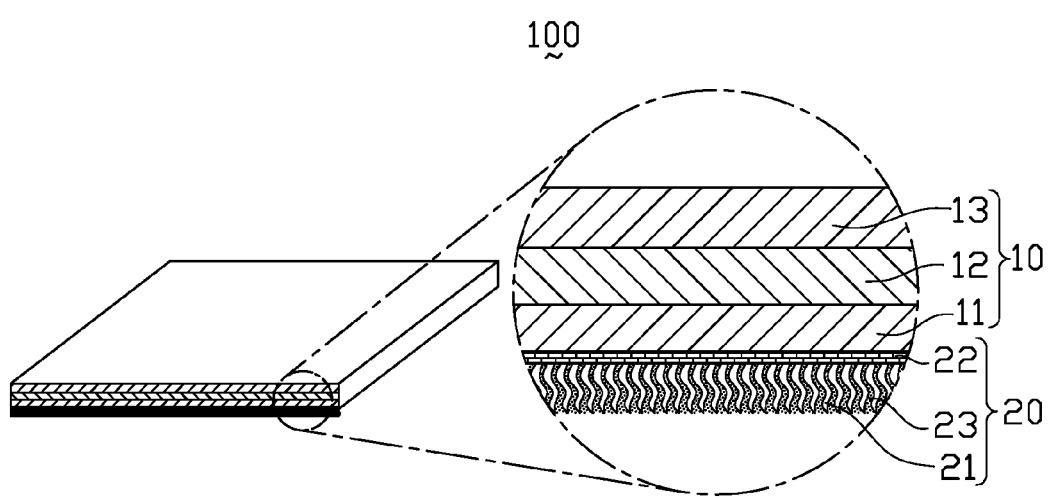
FIG. 1 is a cross sectional view of a self bonding floor tile according to an embodiment of the present invention, with a part of the self bonding floor tile enlarged.

FIG. 1 is a cross sectional view of a self bonding floor tile according to an embodiment of the present invention, with a part of the self bonding floor tile enlarged. Referring to FIG. 1, the self bonding floor tile 100 of the present invention includes a main body 10 and a self bonding layer 20.

The main body 10 is the core layer of the self bonding floor tile 100; the hardness, weight and other physical characteristics are decided by the main body 10. The main body 10 is a PVC body and includes a base layer 11, a decoration layer 12 and a wear-resistant layer 13.

Figure 3:
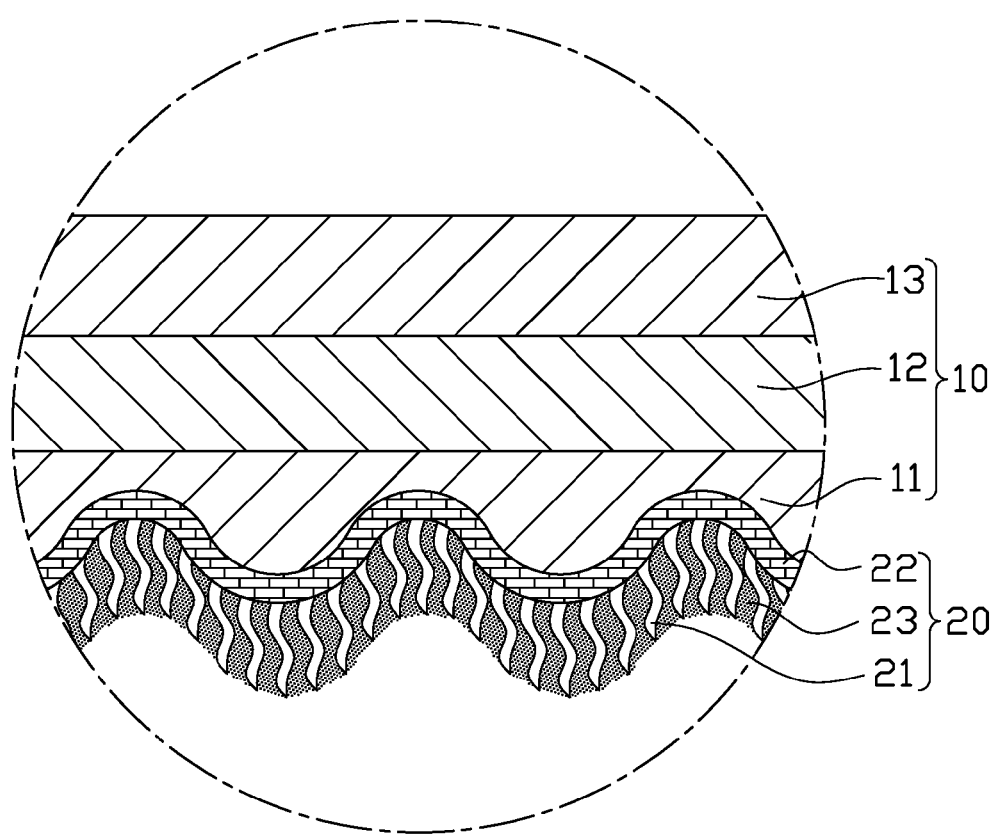
FIG. 3 is a partly enlarged, cross sectional view of a self bonding floor tile according to an embodiment of the present invention.

The base layer 11 may be composed of one layer or multilayer with each layer being made of a mixture including polyvinylchloride (PVC), plasticizer and filler. The base layer 11 may also be composed of a backing layer, a glass fiber layer and a middle layer stacked in sequence. The backing layer functions as a balance layer. The glass fiber layer is located above the backing layer and functions as a strengthen layer. The middle layer is located above the glass fiber layer and functions as a filler layer. Both of the middle layer and the backing layer are made of a mixture including polyvinylchloride, plasticizer and filler. Alternatively, the base layer 11 may also be composed of a backing layer, a first glass fiber layer, a first middle layer, a second glass fiber layer, and a second middle layer stacked in sequence. The backing layer functions as a balance layer. Both of the first glass fiber layer and the second glass fiber layer function as strengthen layers, and both of the first middle layer and the second middle layer function as filler layers. The first middle layer, the second middle layer and the backing layer are made of a mixture including polyvinylchloride, plasticizer and filler. In another embodiment, the base layer 11 may also be composed of a backing layer, a rubber layer or a cork layer, and a middle layer stacked in sequence. In a further embodiment, as shown in FIG. 3, the base layer 11 may have concave and convex texture formed at the bottom side. The texture may be a latticed pattern composed of a plurality of continuous concaves or convexes, or may be a pattern composed of a plurality of discrete concaves or convexes. A configuration of the concave or convex may be circular, ellipse, orthohexagonal, pentagon, rectangular, or square, etc, and a depth of the concave or convex is ranged from 0.1-1.0 mm.

The decoration layer 12 is located above the base layer 11, and it is formed from printing patterns on a polyvinylchloride film or directly adhering decorative paper on the base layer 11, or directly printing patterns on the base layer 11, such that the self bonding floor tile 100 has an excellent visual effect.

The wear-resistant layer 13 is located above the decoration layer 12, and it is usually of a transparent film made of polyvinylchloride. The wear-resistant layer 13 is for increasing the wear-resistant quality of the self bonding floor tile 100, and decreasing the wear and tear of the self bonding floor tile 100, such that the self bonding floor tile remains a good-looking appearance after long term usage.

The self bonding layer 20 is located below the base layer 11 of the main body 10, and includes an absorptive element 21, a first adhesive 22 and a second adhesive 23 disposed at top and bottom sides of the absorptive element 21 respectively.

The absorptive element 21 includes a soft substance with Shore hardness in the range of 20°-60°, which provides the self bonding floor tile of good resiliency and comfortable feeling when it is trod. The soft substance has a plurality of fine or wick structures such as fine pores or fine apertures which could be penetrated by fluid. The soft substance may be fibers or sponge. The fibers may be cotton fiber, glass fiber, synthetic fiber, blended fiber, or etc with a denier of the fiber being 1-10 D. The synthetic fiber may be viscose fiber, polyester fiber, nylon, polyacrylonitrile fiber, polyvinyl chloride fiber, polyvinyl alcohol fiber, or etc. The blended fiber includes at least two different fibers in a single fiber strand or yarn, and the blended fiber may be Polyester/Cotton blend, Nylon/Wool blend, Nylon/Acetate blend, Ramie/Polyester blend, Ramie/Acrylic blend, Wool/Cotton blend, Linen/Cotton blend, Linen/Silk blend, Linen/Rayon blend, Silk/Wool blend, Rayon/Cotton blend, or etc. The fibers constituting the absorptive element 21 may be single fiber or multi-fiber twisted together by a plurality of single fibers. A length of the fiber ranges from 0.05 mm to 10 mm, and preferably 0.1 mm-2 mm, and more preferably, a length of the fiber is greater than a depth but smaller than a double depth of the concave.

The first adhesive 22 may be acrylate adhesive, PVC paste resins, epoxy glue, phenol glue, vinyl adhesive, polyurethane adhesive, amino resin adhesive, or etc. The first adhesive 22 is for providing sufficient adhesion between the self bonding layer 20 and the main body 10 such that the self bonding layer 20 and the main body 10 are securely bonded together. The first adhesive 22 is a mixture of liquid and solid under room temperature, and can be cured into solid by heat, ultraviolet light, or etc. The material of the first adhesive 22 could make the first adhesive 22 be rapidly cured is preferred, and an adhesion between the first adhesive 22 and the main body 10 is greater than the adhesion between the second adhesive 23 and the support body after the first adhesive 22 is cured. During manufacturing, at least a portion of the soft substance extends into the first adhesive 22 with the other portion of the soft substance extending beyond the first adhesive 22, and the soft substance is securely joined with the first adhesive 22 and the main body 10 into a single piece after the first adhesive 22 is cured.

The second adhesive 23 may be hot-melt pressure sensitive adhesive (HMPSA), and the second adhesive 23 is in solid state under room temperature. After being melt, at least a portion of the second adhesive 23 penetrates into a deeper position of the other portion of the absorptive element 21, for providing sufficient adhesion between the self bonding floor tile 100 and a support body such as floor, ceiling, wall, wardrobe, or etc., which intends to be decorated, such that the self bonding floor tile 100 can be installed to the support body easily. The second adhesive 23 also make sure that the self bonding floor tile 100 can be removed from the support body easily by a sufficient force without leaving debris of the second adhesive 23 on the support body. The second adhesive 23 further has good waterproof capability for providing the self bonding floor tile 100 of good moistureproof capability. After the second adhesive 23 penetrates into the absorptive element 21, the second adhesive 23 is not solidified, this makes the absorptive element 21 still be soft and makes the bottom of the self bonding floor tile 100 be resilient and could endure a greater deformation, and therefore provides the self bonding floor tile 100 of good resiliency and makes the user feel comfortable when it is trod, and further decreases noises generated at the time of the floor tile 100 being trod. For convenient manufacture, package and transportation of the floor tile 100, a release paper (not shown) with silicone oil spread thereon may be attached on a lower surface of the second adhesive 23.

It should be noted that, the thickness of the first adhesive and the thickness of the second adhesive occupies ⅕-⅘ of the thickness of the self bonding layer 20, and the thickness of the first adhesive and the second adhesive each occupies ½ of the thickness of the self bonding layer 20 is preferred. That is, the thickness of the first adhesive could be ¼-4 times of the thickness of the second adhesive, the thickness of the first adhesive and the thickness of the second adhesive could equal to each other.

Figure 2:
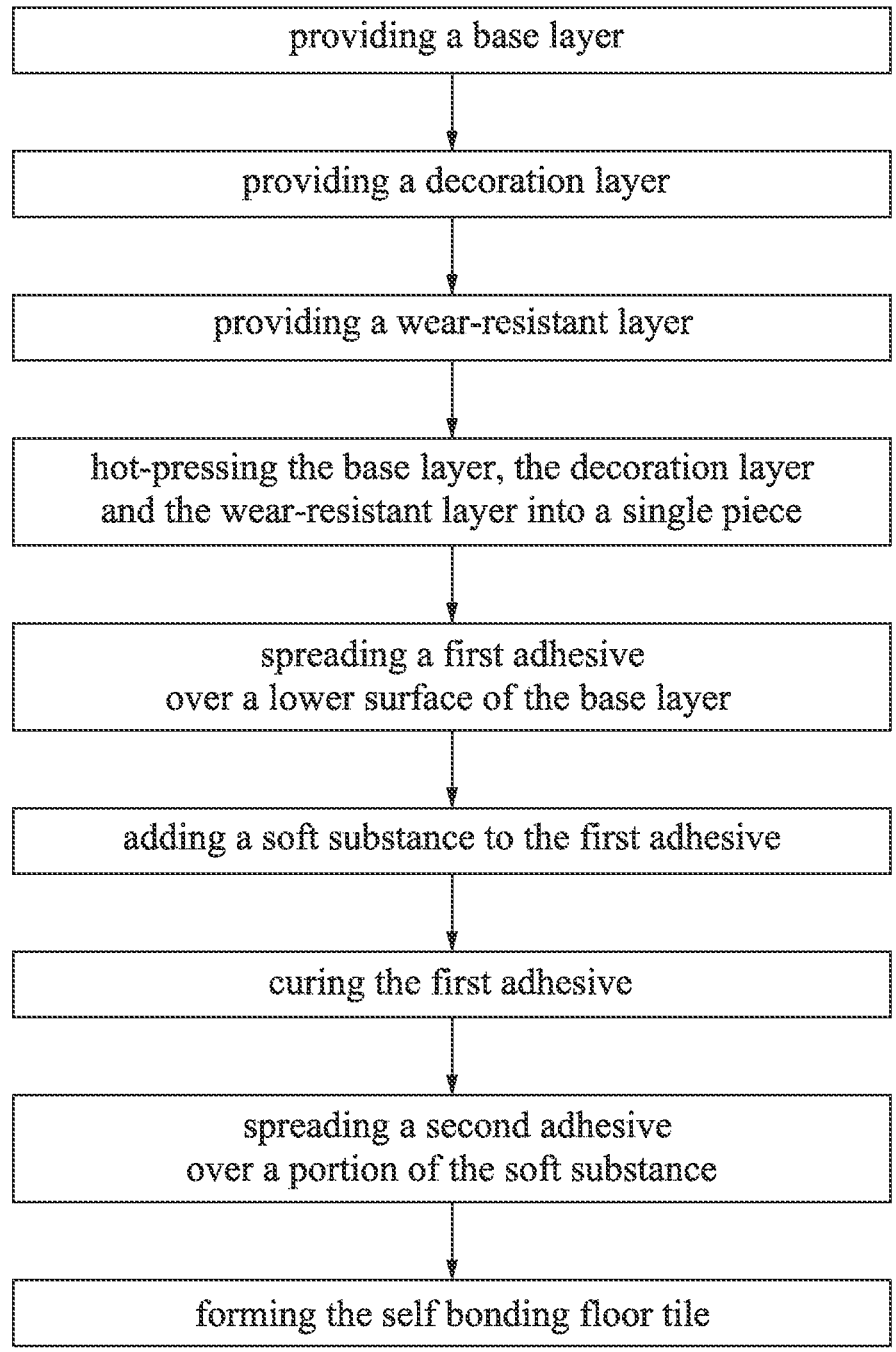
FIG. 2 is a flow chart of a manufacturing method of the self bonding floor tile according to an embodiment of the present invention.

FIG. 2 shows a manufacturing method of the present self bonding floor tile 100. Referring to FIG. 2, the manufacture method of the self bonding floor tile 100 includes:

Step 1: providing a pre-manufactured base layer 11.

Step 2: providing a pre-manufactured decoration layer 12.

Step 3: providing a pre-manufactured wear-resistant layer 13.

Step 4: hot-pressing the base layer 11, the decoration layer 12 and the wear-resistant layer 13 into a single piece, thereby forming the main body 10 of the self bonding floor tile 100.

Step 5: spreading a first adhesive 22 over a lower surface of the base layer 11 by spraying, rolling, blade coating or other coating methods.

Step 6: adding a soft substance to the first adhesive 22 with a portion of the soft substance extending into the first adhesive 22, and the other portion of the soft substance exposing outside of the first adhesive 22. If the soft substance is composed of short fibers, it is added to the first adhesive by flocking process in a density of 10-100 gram fibers per square meter. More concretely, the fibers are given a negative charge while the main body 10 is earthed. Because of attractions generated between the fibers and the main body, the fibers fly vertically onto the main body 10 and are attached to the previously applied first adhesive 22. This makes the absorptive element 21 be implanted in the first adhesive 22 in a style like hair in scalp, with fine apertures formed between adjacent fibers. If the soft substance is composed of sponge, the soft substance is placed on the first adhesive 22 directly. If the soft substance is composed of long fibers, it can be woven into a sheet at first and then placed on the first adhesive 22.

Step 7: curing the first adhesive 22 by UV lights or heat, therefore, the absorptive element 21 is securely coupled with the first adhesive 22 into a single piece.

Step 8: spreading a second adhesive 23 over the portion of the absorptive element 21 which is exposed outside of the first adhesive 22 by hot transfer process, spraying or other suitable methods, and making the second adhesive 23 to sufficiently penetrate into the pores or wick structures of the absorptive element 21. In this step, the second adhesive 23 is heated to a molten state under a temperature of 120 to 200 degrees centigrade (preferably under 140 to 170 degrees centigrade), and spread over the absorptive element 21 in an amount of 50-150 grams per square (preferably 80-100 grams per square), after a period of time, the second adhesive 23 sufficiently penetrates into the adsorptive element 21.

Step 9: attaching a release paper on the lower surface of the second adhesive 23 and finally forming the self bonding floor tile 100.

Furthermore, the present invention provides a manufacturing method of another embodiment of the present self bonding floor tile 100. The method includes:

Step 1: providing a pre-manufactured base layer 11.

Step 2: providing a pre-manufactured decoration layer 12.

Step 3: providing a pre-manufactured wear-resistant layer 13.

Step 4: providing a graining board with a concave and convex pattern formed on its top surface;

Step 5: stacking the graining board, the base layer 11, the decoration layer 12 and the wear-resistant layer 13 in sequence, and hot-pressing the graining board, the base layer 11, the decoration layer 12 and the wear-resistant layer 13, and then removing the graining board. Due to the concave and convex pattern formed on the graining board, a conversed convex and concave pattern is formed on the bottom surface of the base layer 11. Alternatively, the wear-resistant layer 13, the decoration layer 12, the base layer 11 may firstly be adhered together by glue and then the convex and concave pattern is pressed on the base layer 11 by the graining board.

Step 6: spreading a first adhesive 22 over a lower surface of the base layer 11 by spraying, rolling, blade coating, or other coating methods, making the first adhesive 22 fill the concaves of the pattern.

Step 7: adding a soft substance to the first adhesive 22 with a portion of the soft substance extending into the first adhesive 22, and the other portion of the soft substance exposing outside of the first adhesive 22.

Step 8: curing the first adhesive 22 by UV lights or heat to securely couple the absorptive element 21 with the first adhesive 22 into a single piece.

Step 9: spreading a second adhesive 23 over the portion of the absorptive element 21 which is exposed outside of the first adhesive 22 by hot transfer process, spraying or other suitable methods, and making the second adhesive 23 sufficiently penetrate into the pores or wick structures of the absorptive element 21.

Step 10: attaching a release paper on the lower surface of the second adhesive 23 and finally forming the self bonding floor tile 100.

As mentioned above, the self bonding floor tile 100 at least has the following advantages:

1. The self bonding floor tile 100 of the present invention utilizes the soft substance with fine pores and wick structures as the absorptive element 21 of the self bonding layer 20. Due to the soft and porous characteristics, the self bonding floor tile 100 will not excessively bonded to the support body going to be decorated. Therefore, when the self bonding floor tile 100 needs to be partly replaced, it is convenient to remove the part of the self bonding floor tile 100 which needs to be replaced. Furthermore, due to the porous and large surface area characteristics of the absorptive element 21, when spreading the second adhesive 23, the second adhesive 23 will penetrate into the interior of the absorptive element 21 besides spreading over the outer surface of the absorptive element 21. Therefore, the adhesion between the second adhesive 23 and the absorptive element 21 is greater than that between the second adhesive 23 and the support body going to be decorated. Thus, when removing or replacing the self bonding floor tile 100, the self bonding floor tile 100 can be easily removed from the support body by a sufficient force without leaving debris of the second adhesive 23 on the support body. This simplifies the remove process of the self bonding floor tile 100, and makes the self bonding floor tile 23 to be easily and partly replaced, with low installation and replacement cost. Furthermore, because both of the first adhesive 22 and the second adhesive 23 extend into the absorptive element 21, a total thickness of the self bonding floor tile 100 is therefore decreased.

2. In the manufacturing method of the self bonding floor tile 100, the absorptive element 21 is added to the first adhesive 22 after the first adhesive 22 is spread over the base layer 11; therefore, the absorptive element 21 can be securely coupled with the first adhesive 22 into a single piece after the first adhesive 22 is cured, which increases the adhesion between the self bonding layer 20 and the base layer 11 and prevents the self bonding layer 20 from delaminating from the base layer 11 during removing of the self bonding floor tile 100, and results in the convenient remove and replacement of the self bonding floor tile 100. Moreover, because the second adhesive 23 is directly spread over the absorptive element 21, as compared to a conventional art in which the adhesive needs to be spread over the release paper at first and then transferred to the base layer, the present invention can avoid the unsecure adhering between the adhesive and the base layer due to the drape of the release paper, and furthermore, decrease the burden of the release paper and the incidence rate of the drape of the release paper.

In the present embodiment, the base layer 11 is made of a mixture of polyvinylchloride (PVC), plasticizer and filler. Optionally, the base layer 11 may be made of conventional log, PVC/Wood Flour Composites, marble, ceramics or etc. If the base layer 11 is made of such materials, the decoration layer 12 and/or the wear-resistant layer 13 may be omitted as needed. In case both of the decoration layer 12 and the wear-resistant layer 13 are omitted, the base layer 11 functions as the main body 10 of the self bonding floor tile 100. Correspondingly, the process for providing the decoration layer 12 and/or the wear-resistant layer 13 also needs to be deleted.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A self bonding floor tile, comprising:
a main body having a concave and convex texture at its bottom; and
a self bonding layer connected with the main body, and comprising an absorptive element, a first adhesive and a second adhesive, the first adhesive connecting the bottom of the main body with the self bonding layer, the absorptive element comprising a plurality of fibers with a length greater than a depth but smaller than a double depth of the concave and the fibers being implanted into the first adhesive with at least a portion of the absorptive element extending into the first adhesive and the other portion of the absorptive element extending beyond the first adhesive, and at least a portion of the second adhesive penetrating into the other portion of the absorptive element for connecting the self bonding layer with a support body which could be decorated by a plurality of the self bonding floor tiles.

2. The self bonding floor tile according to claim 1, wherein the absorptive element is added to the first adhesive after the first adhesive is spread over the main body and is secured to the main body into a single piece after the first adhesive being cured, the second adhesive is spread over the absorptive element after the absorptive element is added to the first adhesive.

3. The self bonding floor tile according to claim 2, wherein an adhesion between the first adhesive and the main body is greater than an adhesion between the second adhesive and the support body after the first adhesive is cured.

4. The self bonding floor tile according to claim 1, wherein the absorptive element is cotton fiber, glass fiber, synthetic fiber, or blended fiber composed of at least two different fibers in a single fiber strand or yarn.

5. The self bonding floor tile according to claim 1, wherein the first adhesive is acrylate adhesive, PVC paste resins, epoxy glue, phenol glue, vinyl adhesive, amino resin adhesive, or polyurethane adhesive, and the second adhesive is hot-melt pressure sensitive adhesive.

6. The self bonding floor tile according to claim 1, wherein the main body includes a base layer, a decoration layer and a wear-resistant layer, the decoration layer is located above the base layer, the wear-resistant layer is located above the decoration layer, and the first adhesive is spread over the base layer.

7. The self bonding floor tile according to claim 6, wherein the base layer, the decoration layer and the wear-resistant layer are formed into a single piece by hot-pressing method.

8. A self bonding floor tile, comprising:
a main body having a concave and convex texture at its bottom; and a self bonding layer being disposed under and connected with the bottom of the main body, for connecting the self bonding floor tile with a support body which could be decorated by a plurality of the self bonding floor tiles;

the self bonding layer comprising an absorptive element, a first adhesive and a second adhesive, the first adhesive being in a solid-liquid mixing state at first, the absorptive element comprising a plurality of fibers with a length greater than a depth but smaller than a double depth of the concave, and at least a portion of the absorptive element being added into the first adhesive with another portion of the absorptive element extending beyond the first adhesive, the absorptive element being secured to the main body after the first adhesive being cured, at least a portion of the second adhesive penetrating into the another portion of the absorptive element after the first adhesive being cured.

9. The self bonding floor tile according to claim 8, wherein the fibers are implanted into the first adhesive by flocking process.

10. The self bonding floor tile according to claim 9, wherein the fiber is added to the first adhesive in a density of 10-100 gram fibers per square meter.

11. The self bonding floor tile according to claim 9, wherein a length of the fiber is in a range of 0.05-10 mm, and a denier of the fiber is 1-10 D.

12. The self bonding floor tile according to claim 8, wherein a thickness of the first adhesive and a thickness of the second adhesive are 1/5-4/5 of the thickness of the self bonding layer.

13. The self bonding floor tile according to claim 12, wherein a thickness of the first adhesive is the same as a thickness of the second adhesive.

14. The self bonding floor tile according to claim 8, wherein an adhesion between the first adhesive and the main body is greater than an adhesion between the second adhesive and the support body after the first adhesive is cured.

15. A self bonding floor tile assembly, comprising:
a self bonding floor tile and a support body which could be decorated by a plurality of the self bonding floor tiles, the self bonding floor tile comprising:
a main body having a concave and convex texture at its bottom; and
a self bonding layer being disposed under and connected with the main body, for connecting the self bonding floor tile with the support body, the self bonding layer comprising an absorptive element, a first adhesive and a second adhesive, the absorptive element comprising a plurality of fibers with a length greater than a depth but smaller than a double depth of the concave, the first adhesive being spread on the bottom of the main body, the fibers having one end embedded into the first adhesive, with at least a portion of the absorptive element extending beyond the first adhesive, the second adhesive penetrating into the at least a portion of the absorptive element.

16. The self bonding floor tile assembly according to claim 15, wherein the fibers are added to the first adhesive in a density of 10-100 g/m$^2$.

17. The self bonding floor tile assembly according to claim 15, wherein a thickness of the first adhesive is the same as a thickness of the second adhesive.

18. The self bonding floor tile assembly according to claim 15, wherein the absorptive element is added to the first adhesive after the first adhesive is spread over the main body and is secured to the main body into a single piece after the first adhesive being cured, and the second adhesive is spread over the absorptive element after the absorptive element is added to the first adhesive.

19. The self bonding floor tile assembly according to claim 15, wherein an adhesion between the first adhesive and the main body is greater than an adhesion between the second adhesive and the support body after the first adhesive is cured.

* * * * *